Fig. 1

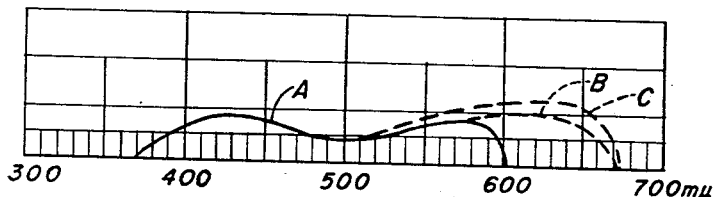

A = 5,5'-DICHLORO-1,1',3,3'-TETRAETHYLBENZIMIDAZOLOCARBOCYANINE IODIDE
B = 5,5'-DICHLORO-3,3',9-TRIETHYLTHIACARBOCANINE BROMIDE
C = 5,5'-DICHLORO-1,1',3,3'-TETRAETHYLBENZIMIDAZOLOCARBOCYANINE IODIDE PLUS 5,5'-DICHLORO-3,3',9-TRIETHYLTHIACARBOCYANINE BROMIDE

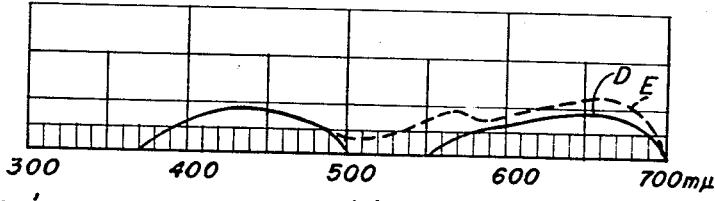

Fig. 2

D = 3,3'-DIMETHYL-9-PHENYL-4,5,4',5'-DIBENZOTHIACARBOCYANINE BROMIDE
E = 3,3'-DIMETHYL-9-PHENYL-4,5,4',5'-DIBENZOTHIACARBOCYANINE BROMIDE PLUS 5,5',6,6'-TETRACHLORO-1,1',3,3'-TETRAETHYL-BENZIMIDAZOLOCARBOCYANINE IODIDE

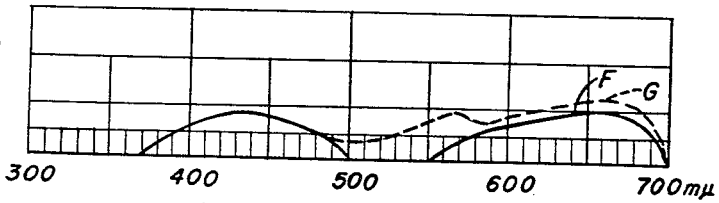

Fig. 3

F = 9-(3-INDOLYL)-3,3'-DIMETHYL-4,5,4',5'-DIBENZOTHIACARBOCYANINE IODIDE
G = 9-(3-INDOLYL)-3,3'-DIMETHYL-4,5,4',5'-DIBENZOTHIACARBOCYANINE IODIDE PLUS 5,5',6,6'-TETRACHLORO-1,1',3,3' TETRAETHYL-BENZIMIDAZOLOCARBOCYANINE IODIDE

Burt H. Carroll
Jean E. Jones
INVENTORS

Patented Sept. 7, 1954

2,688,545

UNITED STATES PATENT OFFICE 2,688,545

SUPERSENSITIZATION OF PHOTOGRAPHIC EMULSIONS WITH BENZIMIDAZOLOCARBOCYANINE DYES

Burt H. Carroll and Jean E. Jones, Rochester, N. Y., assignors to Eastman Kodak Company, Rochester, N. Y., a corporation of New Jersey Application May 28, 1953, Serial No. 358,032

17 Claims. (Cl. 95—7)

This invention relates to photographic emulsions containing certain chain-substituted carbocyanine dyes, and as supersensitizers therefor, certain benzimidazolocarbocyanine dyes.

It is known in the art of making photographic emulsions that certain dyes of the cyanine class alter the sensitivity of photographic emulsions of the gelatino-silver kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with aspectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found a new means of altering the sensitivity in emulsions containing certain chain-substituted carbocyanine dyes. Since the conditions in the emulsion, i. e. the hydrogen ion and/or the silver ion concentration undergo little or no change in our method, we shall designate our new method as a kind of supersensitization.

It is, therefore, an object of our invention to provide photographic emulsions containing certain chain-substituted carbocyanine dyes and, as supersensitizers therefor, certain benzimidazolocarbocyanine dyes. Another object is to provide a process for preparing these sensitized emulsions. Other objects will become apparent from a consideration of the following description and examples.

The chain-substituted carbocyanine dyes useful in practicing our invention can advantageously be represented by the following general formula:

I

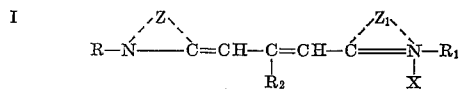

wherein R and $R_1$ each represents an alkyl group, such as methyl, ethyl, n-propyl, carbethoxymethyl, etc., $R_2$ represents an alkyl group, such as methyl, ethyl, etc., an aryl group, such as phenyl, o-, m-, and p-tolyl, etc., or a pyrryl group (e. g. pyrryl, indolyl, benzoindolyl, pyrrocolyl, etc.), X represents an acid radical, such as chloride, iodide, bromide, perchlorate, p-toluenesulfonate, benzenesulfonate, ethylsulfate, methylsulfate, etc., and Z and $Z_1$ each represents the non-metallic atoms necessary to complete a heterocyclic nucleus containing from 5 to 6 atoms in the heterocyclic ring, e. g. a heterocyclic nucleus of the thiazole series, (e. g. thiazole, 4-methylthiazole, 4-phenylthiazole, 5-methylthiazole, 5-phenylthiazole, 4,5-dimethylthiazole, 4,5-diphenylthiazole, etc.), a heterocyclic nucleus of the benzothiazole series (e. g. benzothiazole, 4 - chlorobenzothiazole, 5-chlorobenzothiazole, 6 - chlorobenzothiazole, 7-chlorobenzothiazole, 4 - methylbenzothiazole, 5-methylbenzothiazole, 6 - methylbenzothiazole, 5-bromobenzothiazole, 6 - bromobenzothiazole, 4-phenylbenzothiazole, 5 - phenylbenzothiazole, 4-methoxybenzothiazole, 5 - methoxybenzothiazole, 6-methoxybenzothiazole, 6-iodobenzothiazole, 5-iodobenzothiazole, 4 - ethoxybenzothiazole, 5-ethoxybenzothiazole, 5,6-dimethoxybenzothiazole, 5-hydroxybenzothiazole, 6-hydroxybenzothiazole, etc.), a heterocyclic nucleus of the naphthothiazole series (e. g. α-naphthothiazole, β-naphthothiazole, 7-methoxy-α-naphthothiazole, 8 - methoxy-α-naphthothiazole, 5-methoxy-β-naphthothiazole, 5-ethoxy-α-naphthothiazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. α-naphthoselenazole, β-naphthoselenazole, etc.), a heterocyclic nucleus of the benzoxazole series (e. g. benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e. g. α-naphthoxazole, β-naphthoxazole, etc.), a heterocyclic nucleus of the 2-quinoline series (e. g. 2-quinoline, 6-methyl-2-quinoline, 7-methyl-2-quinoline, 8-methyl-2-quinoline, 6-chloro-2-quinoline, 8-chloro-2-quinoline, 4-chloro - 2 - quinoline, 5-ethoxy-2-quinoline, 6 - ethoxy-2-quinoline, 7-ethoxy-2-quinoline, 6-hydroxy-2-quinoline, 7-hydroxy-2-quinoline, 6-methoxy-2-quinoline, etc.), etc.

The dyes of Formula I above wherein $R_2$ represents a pyrryl group comprise the dyes selected from those represented by the following general formula:

Ia

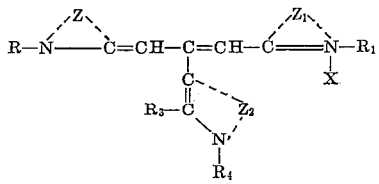

wherein R, $R_1$, Z, $Z_1$, and X each have the values given above, $R_3$ represents a hydrogen atom or an alkyl group, such as methyl, ethyl, etc., $R_4$ represents a hydrogen atom, an alkyl group, such as methyl, ethyl, n-propyl, n-amyl, n-heptyl, n-dodecyl, cyclohexyl, etc., or an aryl group, such as phenyl, o-, m-, and p-tolyl, etc., and $R_3$ and $R_4$ together represent the non-metallic atoms necessary to complete a heterocyclic nucleus of the pyridine series, and $Z_2$ represents the non-metallic atoms necessary to complete a pyrrole nucleus (includes simple pyrrole nuclei or condensed nuclei, e. g. indole).

The dyes represented by Formula I above wherein $R_2$ represents an alkyl or an aryl group have been previously described in the prior art. See, for example, U. S. patents 1,934,659 (dated November 7, 1933), 2,369,646 (dated February 20, 1945), 2,369,657 (dated February 20, 1945), etc. The dyes of Forumla I above wherein $R_2$ represents a pyrryl group or the dyes of Formula Ia have been previously described in Heseltine et al. U. S. application Serial No. 267,928, filed January 23, 1952.

The benzimidazolocarbocyanine dyes useful in practicing our invention can advantageously be represented by the following general formula:

II

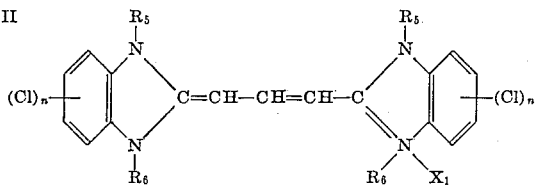

wherein $R_5$ and $R_6$ each represents an alkyl group, such as methyl, ethyl, allyl (vinylmethyl), etc., $n$ represents a positive integer of from 1 to 2, and $X_1$ represents an acid radical, for example, those set forth above for X. The dyes represented by Formula II can advantageously be prepared according to the methods described in Van Lare U. S. application Serial No. 339,459, filed on February 27, 1953.

According to our invention, we incorporate one or more of the carbocyanine dyes selected from those represented by Formulas I or Ia above with one or more of the dyes selected from those represented by Formula II above in a photographic emulsion. Our invention is partcularly directed to the ordinarily employed gelatino-silver-halide emulsions. However, our supersensitizing combinations can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing our invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of our supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the carbocyanine dyes selected from those represented by Formula I or Ia above, which we employ in practicing our invention, is of the order of from 0.025 to 0.30 g. per mol. of silver halide in the emulsion.

The carbocyanine dyes selected from those represented by Formula II above are advantageously employed in concentrations on the order of from 0.025 to 0.30 g. per mol. of silver halide in the emulsion.

Generally speaking, the ratio of concentration of the carbocyanine dye of Formula II to the carbocyanine dye of Formula I or Ia can vary rather widely in our combinations, e. g. from 1:20 to 1:1 (by weight) in many cases.

The methods of incorporating sensitizing dyes in emulsions are well known to those skilled in the art. In practicing our invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes of Formulas I, Ia, and II which we employ, although acetone has also been found to be satisfactory in certain cases. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to the flowable gelatino-silver-halide emulsion, the desired amounts of the stock solution of one of the dyes is slowly added, while stirring the emulsion. Stirring is continued until the dye is thoroughly incorporated in the emulsion. Then the desired amount of the stock solution of the second dye is slowly added to the emulsion, while stirring. Stirring is continued until the second dye is thoroughly incorporated. The super-sensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly our invention is directed to any emulsion containing a combination of the aforesaid sensitizing dyes whereby a supersensitizing effect is obtained.

The following examples will serve to illustrate further the manner of practicing our invention. To different portions of the same batch of photographic gelatino-silver-bromiodide emulsion were added (1) a carbocyanine dye selected from those of Formulas I or Ia above and (2) a combination of the carbocyanine dye of Formula I or Ia and a carbocyanine dye selected from those represented by Formula II above. In some instances, a third coating was prepared using the same emulsion formula and adding only one of the carbocyanine dyes selected from those of Formula II. In some instances, the table will show that this third coating gave only a low speed or one too small to measure in the region transmitted by the filter designated asterisk in the table). Different emulsions were used in some of the examples, although the emulsions of each individual example were obtained from the same batch. However, the coatings of Examples 2 to 7 were obtained from the same batch of emulsion. The coatings of Examples 8 to 10 were obtained from the same batch of emulsion. The coatings of Examples 11 to 13 were obtained from the same batch of emulsion, the coatings of Examples 14 to 16 were obtained from the same batch of emulsion, and the coatings of Examples 17 and 18 were obtained from the same batch of emulsion. The coatings of Examples 18 and 19 were obtained from the same batch of emulsion, the coatings of Examples 21 to 26 were obtained from the same batch of emulsion, the coatings of Examples 28 to 31 were obtained from the same batch of emulsion, the coatings of Examples 32 to 38 were made from the same batch of emulsion, and the coatings of Examples 39 to 42 were made from the same batch of emulsion. Before coating, the emulsions containing the sensitizing dyes were digested for a short time in a tank maintained at 52° C. The different portions of emulsion were then coated on supports and exposed in the usual manner in a spectrograph and a sensitometer (Type Ib) through either a Wratten 25 filter, i. e. a filter which transmits substantially no light of wavelength shorter than 580 mu, a Wratten 12 filter, i. e. a filter which transmits substantially no light of wavelength shorter than 495 mu, or a Wratten 58 filter, i. e. a filter which transmits only light of wavelengths lying between 465 and 620 mu. The following are several examples of such emulsions together with the speed (red, minus blue or green), gamma and fog obtained after development of the exposed emulsions in the usual manner.

| Ex. | Dye (g. per mole of silver halide in emulsion) | Speed | | | Gamma | Fog |
|---|---|---|---|---|---|---|
| | | Minus Blue | Red | Green | | |
| 1 | (a) 5,5'-dichloro-1,1',3,3'-tetraethylbenzimidazolocarbocyanine iodide (0.080) | 31.5 | | | 2.18 | .04 |
| | (b) 5,5'-dichloro-3-3',9-triethylthiacarbocyanine bromide (0.080) | 52.0 | | | 2.78 | .06 |
| | (c) dye (a) (0.040) plus dye (b) (0.080) | 102.0 | | | 2.70 | .06 |
| 2 | (d) dye (b) (0.080) | 45.0 | | | 2.80 | .07 |
| | (e) 5,5',6,6'-tetrachloro-1,1',3,3'-tetraethylbenzimidazolocarbocyanine iodide (0.080) | 46.0 | | | 2.66 | .06 |
| | (f) dye (b) (0.080) plus dye (e) (0.040) | 90.0 | | | 2.77 | .07 |
| 3 | (g) 3,3'-diethyl-9-methyl-4,5,4',5'-dibenzothiacarbocyanine bromide (0.080) | 49.0 | | | 3.10 | .07 |
| | (h) dye (g) (0.080) plus dye (e) (0.040) | 84.0 | | | 2.58 | .07 |
| 4 | (i) dye (a) (0.080) | 34.0 | | | 2.20 | .05 |
| | (j) dye (a) (0.040) plus dye (g) (0.080) | 68.0 | | | 2.70 | .06 |
| 5 | (k) 3,3'-diethyl-9-methyselenacarbocyanine iodide (0.080) | 62.0 | | | 2.75 | .07 |
| | (l) dye (a) (0.040) plus dye (k) (0.080) | 80.0 | | | 2.60 | .05 |
| 6 | (m) dye (k) (0.080) plus dye (e) (0.040) | 100.0 | | | 2.60 | .06 |
| 7 | (n) 3,3'-dimethyl-9-ethylselenacarbocyanine iodide (0.080) | 30.0 | | | 2.03 | .06 |
| | (o) dye (n) (0.080) plus dye (e) (0.040) | 52.0 | | | 2.87 | .05 |
| 8 | (p) dye (a) (0.080) | 26.5 | | | 1.86 | .04 |
| | (q) 3,3'-dimethyl-9-ethylthiacarbocyanine bromide (0.080) | 28.0 | | | 2.07 | .05 |
| | (r) dye (q) (0.080) plus dye (a) (0.040) | 71.0 | | | 2.47 | .05 |
| 9 | (s) dye (e) (0.080) | 46.0 | | | 2.44 | .04 |
| | (t) dye (q) (0.080) plus dye (e) (0.040) | 74.0 | | | 2.32 | .05 |
| 10 | (u) 3,3'-diethyl-9-methyloxacarbocyanine iodide (0.080) | 2.65 | | | 2.18 | .05 |
| | (v) dye (u) (0.080) plus dye (a) (0.040) | 29.0 | | | 2.56 | .04 |
| 11 | (w) dye (e) (0.080) | 49.0 | | | 1.78 | .05 |
| | (x) 5,5'-diacetoxy-3,3'-diethylmethylthiacarbocyanine iodide (0.080) | 30.0 | | | 3.22 | .05 |
| | (y) dye (x) (0.080) plus dye (e) (0.040) | 58.0 | | | 2.84 | .05 |
| 12 | (z) 5,5'-diacetoxy-3,3',9-trimethylthiacarbocyanine iodide (0.080) | 20.0 | | | 3.16 | .05 |
| | (a') dye (z) (0.080) plus dye (e) (0.040) | 54.0 | | | 2.66 | .05 |
| 13 | (b') 3,9-diethyl-3'-methyl-4',5'-benzoxathiacarbocyanine iodide (0.080) | 24.0 | | | 1.86 | .05 |
| | (c') dye (b') (0.080) plus dye (e) (0.040) | 71.0 | | | 2.48 | .05 |
| 14 | (d') dye (e) (0.020) | | | 8.4 | 2.34 | .05 |
| | (e') 3,3'-diethyl-4'-methyloxathiazolocarbocyanine iodide (0.080) | | | 10.5 | 3.26 | .05 |
| | (f') dye (e') (0.080) plus dye (e) (0.020) | | | 13.2 | 3.08 | .05 |
| 15 | (g') dye (e) (0.020) | | | * | * | .05 |
| | (h') 9-ethyl-1',3-dimethylthia-2'-carbocyanine iodide (0.040) | | 7.3 | | 1.68 | .04 |
| | (i') dye (h') (0.040) plus dye (e) (0.020) | | 11.2 | | 1.82 | .05 |
| 16 | (j') 6,6'-dichloro-1,1'-diethyl-2,2'-carbocyanine p-toluenesulfonate (0.040) | | 6.5 | | 2.72 | .05 |
| | (k') dye (j') (0.040) plus dye (e) (0.020) | | 11.0 | | 2.60 | .05 |
| 17 | (l') 9-(l-ethyl-2,5-dimethyl-3-pyrryl)-3,3'-dimethylthiacarbocyanine iodide (0.080) | | 3.8 | | 2.32 | .08 |
| | (m') dye (e) (0.040) | | * | | * | .05 |
| | (n') dye (l') (0.080) plus dye (e) (0.040) | | 4.7 | | 2.54 | .06 |
| 18 | (o') 3-ethyl-9-(1-ethyl-2,5-dimethyl-3-pyrryl)-3'-methyl-4,5,4',5'-dibenzothiacarbocyanine iodide (0.080). | | 7.6 | | 2.57 | .07 |
| | (p') dye (o') (0.080) plus dye (e) (0.040) | | 11.0 | | 2.30 | .06 |
| | (q') dye (e) (0.040) ** | 34.0 | | | 2.72 | .05 |
| 19 | (r') 3,3'-dimethyl-9-(2-methyl-6,7-benzo-3-indolyl)-4,5,4',5'-dibenzothiacarbocyanine p-toluenesulfonate (0.080). | 34.0 | | | 2.06 | .05 |
| | (s') dye (e) (0.080) plus dye (r') (0.080) | 65.0 | | | 2.28 | .07 |

See footnotes at end of table.

| Ex. | Dye (g. per mole of silver halide in emulsion) | Speed Minus Blue | Red | Green | Gamma | Fog |
|---|---|---|---|---|---|---|
| 20 | (t') 3-ethyl-3-methyl-9-(2-methyl-3-indolyl)-4',5',6,7-dibenzoxacarbocyanine perchlorato (0.080). | 17.8 | | | 1.31 | .04 |
|  | (u') dye (t') (0.080) plus dye (e) (0.020) | 41.0 | | | 1.51 | .04 |
|  | (v') dye (e) (0.040) ** | 21.0 | | | 2.40 | .04 |
| 21 | (w') 3,3'-dimethyl-9-(3-pyrryl)thiacarbocyanine iodide (0.080) | 6.2 | | | 2.80 | .05 |
|  | (x') dye (w') (0.080) plus dye (e) (0.040) | 23.0 | | | 2.96 | .05 |
| 22 | (y') 9-(3-indolyl)-3,3'-dimethylthiacarbocyanine p-toluenesulfonate (0.080) | 35.0 | | | 3.38 | .05 |
|  | (z') dye (y') (0.080) plus dye (e) (0.040) | 40.0 | | | 3.21 | .06 |
| 23 | (a'') 3,3'-diethyl-9-(3-indolyl)-4,5,6',7'-dibenzothiacarbocyanine bromide (0.080) | 36.0 | | | 3.40 | .04 |
|  | (b'') dye (a'') (0.080) plus dye (e) (0.040) | 45.0 | | | 3.17 | .06 |
| 24 | (c'') 3,3'-diethyl-9-(3-indolyl)-6,7-benzothiacarbocyanine bromide (0.080) | 30.0 | | | 3.48 | .05 |
|  | (d'') dye (c'') (0.080) plus dye (e) (0.040) | 43.0 | | | 3.17 | .05 |
| 25 | (e'') 9-(2,5-dimethyl-1-phenyl-3-pyrryl)-3,3'-dimethyl-4,5,4',5'-dibenzothiacarbocyanine iodide (0.080). | 16.0 | | | 3.20 | .05 |
|  | (f'') dye (e'') (0.080) plus dye (e) (0.040) | 33.0 | | | 3.06 | .06 |
| 26 | (g'') 9-(3-indolyl)-3,3'-dimethyl-4,5,4',5'-dibenzothiacarbocyanine iodide (0.080) | 30.0 | | | 3.80 | .06 |
|  | (h'') dye (g'') (0.080) plus dye (e) (0.040) | 76.0 | | | 1.14 | .06 |
|  | (i'') dye (e) (0.040) | * | | | * | .04 |
| 27 | (j'') 9-(1-ethyl-2,5-dimethyl-3-pyrryl)-3,3'-dimethyl-4,5,4',5'-dibenzothiacarbocyanine iodide (0.080). | | 5.3 | | 2.38 | .06 |
|  | (k'') dye (j'') (0.080) plus dye (e) (0.040) | | 8.4 | | 2.60 | .06 |
|  | (l'') dye (e) (0.040) ** | | * | | * | .04 |
| 28 | (m'') 3,3'-dimethyl-9-phenyl-4,5,4',5'-dibenzothiacarbocyanine bromide (0.080) | | 8.6 | | 3.26 | .06 |
|  | (n'') dye (m'') (0.080) plus dye (e) (0.040) | | 14.0 | | 2.68 | .08 |
| 29 | (o'') 3,3'-diethyl-9-phenylthiacarbocyanine iodide (0.080) | | 6.6 | | 3.24 | .05 |
|  | (p'') dye (o'') (0.080) plus dye (e) (0.040) | | 9.0 | | 3.08 | .06 |
| 30 | (q'') 9-ethyl-3,3'-dimethyl-4,5,4',5'-dibenzoselenacarbocyanine iodide (0.080) | | 27.0 | | 3.10 | .05 |
|  | (r'') dye (q'') (0.080) plus dye (e) (0.040) | | 31.0 | | 2.86 | .06 |
| 31 | (s'') 3,3'-dimethyl-9-phenyl-4,5,4',5'-dibenzoselenacarbocyanine bromide (0.080) | | 4.7 | | 2.78 | .05 |
|  | (t'') dye (s'') (0.080) plus dye (e) (0.040) | | 8.4 | | 2.59 | .06 |
|  | (u'') dye (b) (0.080) | | 30.0 | | 2.28 | .06 |
| 32 | (v'') 5,5'-dichloro-1,1',3,3'-tetramethylbenzimidazolocarbocyanine iodide (0.040) | 14.8 | | | 1.29 | .06 |
|  | (w'') dye (b) (0.080) plus dye (v'') (0.040) | | 59.0 | | 2.17 | .06 |
|  | (x'') dye (m'') (0.080) | | 6.9 | | 2.62 | .07 |
| 33 | (y'') dye (m'') (0.080) plus dye (v'') (0.040) | | 23.5 | | 2.30 | .07 |
|  | (z'') dye (q) (0.080) | | 22.5 | | 1.59 | .05 |
| 34 | (a''') dye (q) (0.080) plus dye (r'') (0.040) | | 48.0 | | 2.05 | .05 |
|  | (b''') 3,3'-diethyl-9-methyl-4',5'-benzoxathiacarbocyanine iodide (0.080) | 18.0 | | | 2.28 | .05 |
| 35 | (c''') dye (b''') (0.080) plus dye (v'') (0.040) | 23.5 | | | 2.31 | .05 |
|  | (d''') dye (b') (0.080) | | | 5.35 | 2.52 | .07 |
| 36 | (e''') dye (b') (0.080) plus dye (v'') (0.040) | | | 10.0 | 2.30 | .05 |
|  | (f''') dye (o'') (0.080) | | | 6.75 | 2.97 | .06 |
| 37 | (g''') dye (o'') (0.080) plus dye (v'') (0.040) | | | 8.9 | 2.78 | .06 |
|  | (h''') 3,3'-dimethyl-9-(2-methyl-3-indolyl)oxathiacarbocyanine iodide (0.080) | 9.35 | | | 3.08 | .05 |
| 38 | (i''') dye (h''') (0.080) plus dye (v'') (0.040) | 21.0 | | | 2.50 | .05 |
|  | (j''') 1,1',3,3'-tetraallyl-5,5'-dichlorobenzimidazolocarbocyanine iodide (0.080) | 15.0 | | | 3.04 | .06 |
| 39 | (k''') dye (m'') (0.080) | | 6.90 | | 3.04 | .06 |
|  | (l''') dye (m'') (0.080) plus dye (j''') (0.040) | | 10.2 | | 2.64 | .07 |
| 40 | (m''') dye (q) (0.080) | | 20.5 | | 1.78 | .05 |
|  | (n''') dye (q) (0.080) plus dye (j''') (0.040) | | 28.0 | | 2.13 | .05 |
| 41 | (o''') dye (b''') (0.080) | 18.0 | | | 2.58 | .05 |
|  | (p''') dye (b''') (0.080) plus dye (j''') (0.040) | 25.5 | | | 2.49 | .05 |
| 42 | (q''') dye (b) (0.080) | | 32.5 | | 2.30 | .05 |
|  | (r''') dye (b) (0.080) plus dye (j''') (0.040) | | 45.5 | | 2.21 | .06 |
| 43 | (s''') dye (h''') (0.080) | 8.3 | | | 3.20 | .05 |
|  | (t''') dye (h''') (0.080) plus dye (j''') (0.040) | 19.5 | | | 2.48 | .05 |

*=too low to measure.
**=coatings made at different time but with same emulsion batch.

The accompanying drawing illustrates the supersensitizing effect obtained with three of our new combinations of dyes in gelatino-silver-bromiodide emulsions. Each figure of the drawing is a diagrammatic reproduction of two, or in the case of Figure 1, three spectrographs. In each figure the sensitivity of the emulsion containing the carbocyanine dye of Formula I or Ia is represented by the solid lower curve. The upper curve represents the sensitivity conferred on the emulsion by the combination of the carbocyanine dye of Formula I or Ia and the carbocyanine dye of Formula II. In Figures 2 and 3, the curve showing the sensitivity conferred on the emulsion by the carbocyanine dye of Formula II alone has been eliminated as it is identical with that of Curve A in Figure 1.

In Figure 1, curve A represents the sensitivity of an ordinary gelatino-silver-bromiodide emulsion sensitized with 5,5'-dichloro-1,1',3,3'-tetraethylbenzimidazolocarbocyanine iodide, curve B represents the sensitivity of the same emulsion containing 5,5'-dichloro-3,3',9-triethylthiacarbocyanine bromide, and curve C represents the sensitivity of the same emulsion containing 5,5'-dichloro - 1,1',3,3' - tetraethylbenzimidazolocarbocyanine iodide and 5,5'-dichloro-3,3',9-triethylthiacarbocyanine bromide. The sensitometric measurements for these emulsions are given in Example 1 of the above table.

In Figure 2, curve D represents the sensitivity of an ordinary gelatino-silver-bromiodide emulsion sensitized with 3,3'-dimethyl-9-phenyl-4,5,4',5'-dibenzothiacarbocyanine bromide, and curve E represents the sensitivity of the same emulsion containing 3,3' - dimethyl - 9 - phenyl-4,5,4',5' - dibenzothiacarbocyanine bromide and 5,5',6,6' - tetrachloro - 1,1',3,3' - tetraethylbenzimidazolocarbocyanine iodide. The sensitometric measurements for these emulsions are given in Example 28 in the above table.

In Figure 3, curve F represents the sensitivity of an ordinary gelatino-silver-bromiodide emulsion sensitized with 9-(3-indolyl)-3,3'-dimethyl-4,5,4',5' - dibenzothiacarbocyanine iodide, and curve G represents the sensitivity of the same emulsion containing 9-(3-indolyl)-3,3'-dimethyl-4,5,4',5' - dibenzothiacarbocyanine iodide and 5,5',6,6' - tetrachloro - 1,1',3,3' - tetraethylbenzimidazolocarbocyanine iodide. The sensitometric measurements for these emulsions are given in Example 26 of the above table.

Our invention is primarily directed to the ordinarily employed gelatino-silver-halide developing-out emulsions, e. g. gelatino-silver-chloride, -chlorobromide, -chloroiodide, -chlorobromiodide, -bromide and -bromiodide developing-out emulsions. While the results in the above table were used alone, does not appreciably increase the speed of the combination with dye (b).

TABLE A

| Coating | g. dye/mole of AgIBr | Dye | Green Speed | Gamma | Minus Blue Speed | Gamma | Fog |
|---|---|---|---|---|---|---|---|
| 1 | 0.020 | dye (e) | 14.8 | 2.24 | 41.0 | 2.34 | .03 |
| 2 | 0.040 | ___do___ | 21.5 | 2.14 | 59.0 | 2.20 | .03 |
| 3 | 0.080 | ___do___ | 29.5 | 2.08 | 74.0 | 2.10 | .03 |
| 4 | 0.080 | dye (b) | 31.0 | 2.18 | 47.0 | 2.40 | .05 |
| 5 | | dye (b) (0.080)+dye (e) (0.020) | 53.0 | 2.06 | 94.0 | 2.40 | .05 |
| 6 | | dye (b) (0.080)+dye (e) (0.040) | 69.0 | 1.92 | 130.0 | 2.20 | .05 |
| 7 | | dye (b) (0.080)+dye (e) (0.080) | 65.0 | 1.90 | 150.0 | 2.02 | .05 |

In each of the above tables the speed figures are 10/i.

obtained using gelatino-silver-bromiodide emulsions, excellent results have also been obtained using gelatino-silver-chlorobromide emulsions. Emulsions which form the latent image mostly inside the silver halide grains, such as the emulsions set forth in U. S. Patent 2,456,956, dated December 21, 1948, can also be employed in practicing our invention.

The emulsions prepared in accordance with our invention can be coated in the usual manner on any suitable support, e. g. glass, cellulose nitrate film, cellulose acetate film, polyvinylacetal resin film, paper or metal.

Photographic silver halide emulsions, such as those listed above, containing the supersensitizing combinations of our invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application 771,380, filed August 29, 1947, etc.; or mixtures of such addenda. Dispersing agents for color couplers, such as those set forth in U. S. Patents 2,322,027 and 2,304,940, can also be employed in the above-described emulsions.

In the above table it will be noted that in certain examples the amounts of dyes used in the supersensitizing combinations do not correspond to the amounts used with each dye alone. Actually, supersensitization occurs according to our invention when the combination of dyes gives more speed than either dye alone at any concentration. Thus, in some instances, the amount of dye, when used alone, is not identical with that used in the supersensitizing combination. This is due to the fact that optimum conditions have been used, insofar as possible, in each of the coatings. Use of larger amounts of dyes in the supersensitizing combinations is not necessary, and in some instances, is actually detrimental. This is illustrated in the following table where it is evident that use of larger amounts of dye (e) in the supersensitizing combination, more than half that required for optimum sensitizing by dye (e)

The above is illustrative of an increase, but it should be noted that the optimum concentration for the supersensitizing combination is rarely, if ever, the sum of the optimum concentrations for the separate dyes.

As noted above, the dyes of Formula Ia can advantageously be prepared according to the method described in Heseltine et al. U. S. application Serial No. 267,928. Briefly, this method comprises condensing an intermediate selected from those represented by the following general formula:

III
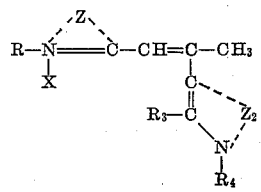

wherein R, $R_3$, $R_4$, Z, $Z_2$ and X each have the values given above, with a cyclammonium quaternary salt selected from those represented by the following general formula:

IV
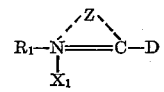

wherein $R_1$, $X_1$, and Z each have the values given above, and D represents an electro-negative group, such as an alkylmercapto group, an arylmercapto group, e. g.:

IVa $\qquad -S-R_7$ wherein $R_7$ represents an alkyl or an aryl group, e. g. methyl, ethyl, phenyl, o-, m-, and p-tolyl, etc., or a β-arylaminovinyl group, e. g.:

IVb
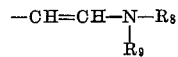

wherein $R_8$ represents an acyl group, such as acetyl, propionyl, benzoyl, etc., or a hydrogen atom, and $R_9$ represents an aryl group, e. g. phenyl, o-, m-, and p-tolyl, etc.

The condensation of the compounds represented by Formula III with the compounds of Formula IV can advantageously be accelerated by heating, e. g. the temperatures varying from room temperature (about 20° C.) to 100° C., or to the reflux temperature of the reaction medium. Inert solvents, such as the aliphatic alcohols, e. g. ethanol, n-propanol, n-butanol, etc., 1,4-dioxane, pyridine, etc., can be used. Basic condensing agents can also be employed to advantage. Typical basic condensing agents comprise the trialkylamines (e. g. triethylamine, tri-n-butylamine, n-propylamine, triisoamyl amine, etc.), the N,N-dialkylanilines (e. g. N,N-dimethylaniline, N,N- diethylaniline, etc.), the N-alkylpiperidines (e. g. N-methylpiperidine, N-ethylpiperidine, etc.), etc.

The intermediates represented by Formula III can advantageously be prepared by condensing a cyclammonium quaternary salt selected from those represented by the following general formula:

V 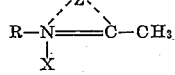

wherein R, X and Z each have the values given above, together with an alkyl orthoacetate selected from those represented by the following general formula:

VI 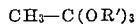  $CH_3-C(OR')_3$ wherein R' represents an alkyl group, such as methyl, ethyl, etc., and a compound selected from those represented by the following general formula:

VII 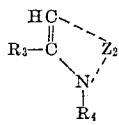

wherein $R_3$, $R_4$, and $Z_2$ each have the values given above. The intermediates represented by Formula III above are new. The intermediates of Formula IV wherein D represents a β-arylaminovinyl group have been previously described in the art (see, for example, British Patent 344,409, accepted March 4, 1931). The intermediates of Formula IV wherein D represents an electronegative group are also known (see, for example, British Patent 424,559, accepted February 18, 1935). The intermediates of Formulas V, VI, and VII have also been previously described in the art (for example, those of Formula V in U. S. Patent 2,537,880, issued January 9, 1951, those of Formula VI in U. S. Patent 1,994,563, issued March 19, 1935, and those of Formula VII in British Patent 529,440, accepted November 21, 1940).

The following examples will serve to illustrate the manner of preparing a number of the dyes embraced by Formula Ia above.

*Example 44.—9-(1-ethyl-2,5-dimethyl-3-pyrryl)- 3,3'-dimethylthiacarbocyanine iodide*

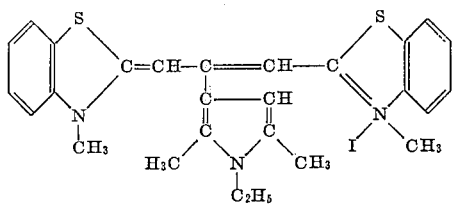

1 - ethyl - 2,3',5,6 - tetramethyl - 3 - pyrrolothiacarbocyanine iodide (1.09 grams, 1 mol.) and 3 - methyl - 2 - methylmercaptobenzothiazolium p - toluenesulfonate (0.92 gram, 1 mol.) were dissolved in ethyl alcohol (10 ml.) of triethylamine (0.5 ml., 2 mol.) was added. The reaction mixture was heated under reflux for ten minutes and the crude dye precipitated by the addition of water (100 ml.). The crude dye was filtered off, dried and then recrystallized from methyl alcohol; after two recrystallizations the yield of pure dye was 0.78 gram (53 percent); melting point 169°–170° C.

*Example 45.—9 - (2,5 - dimethyl - 1 - phenyl-3 - pyrryl) - 3,3' - dimethyl - 4,5,4',5' - dibenzothiacarbocyanine iodide*

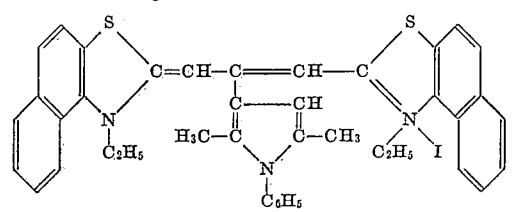

2,3',5,6 - tetramethyl - 1 - phenyl - 4',5' - benzo - 3 - pyrrolothiacarbocyanine iodide (0.83 gram, 1 mol.) and 1-methyl-2-methylmercaptonaphtho - 1,2 - thiazolium p - toluenesulfonate (1.04 grams, 1 mol.+70% excess) and triethylamine (1.0 ml., 1 mol.+300% excess) were refluxed in ethyl alcohol (10 ml.) for one hour. The reaction mixture was chilled and filtered and the crude dye washed with water, methyl alcohol, and acetone, and dried. The yield of purified dye after two recrystallizations from methyl alcohol was 53%; M. P. 217°–18° C. dec.

*Example 46.—3,3' - diethyl - 9 - (3 - indolyl) - 4,5,4',5'-dibenzoselenathiacarbocyanine iodide*

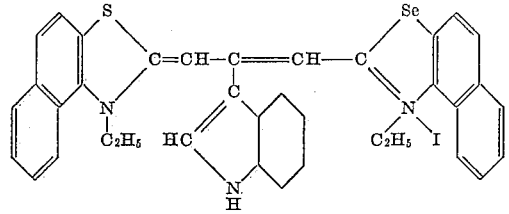

3' -ethyl - 8 - methyl - 4',5' - benzo - 3 - indolothiacarbocyanine iodide (0.50 gram, 1 mol.), 1 - ethyl - 2 - ethylmercaptonaphtho [1,2] selenazolium ethosulfate (0.90 gram, 1 mol.+100% excess) and triethylamine (0.6 ml., 1 mol.+300% excess) were refluxed in ethyl alcohol (10 ml.) for one hour. The reaction mixture was filtered hot and the product was thoroughly washed with methyl alcohol and dried. The yield of purified dye was 59% after two recrystallizations from cresol and methyl alcohol; M. P. 281°–2° C. dec.

*Example 47.—3,3' - dimethyl - 9 - (2 - methyl - 6,7 - benzo - 3 - indolyl) - 4,5,4',5' - dibenzothiacarbocyanine p-toluenesulfonate*

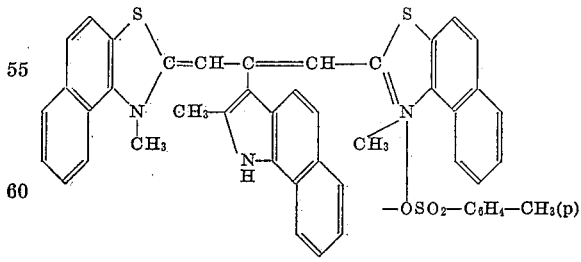

2,3',8 - trimethyl - 4',5',6,7 - dibenzo - 3 -indolothiacarbocyanine p-toluenesulfonate (0.59 g., mol.), 1-methyl-2-methylmercaptonaphtho [1,2] thiazolium p-toluenesulfonate (0.63 g., 1 mol.+ 50%) and triethylamine (0.7 ml., 1 mol.+400%) were refluxed in ethyl alcohol (20 ml.) for one hour. The reaction mixture was filtered hot and the crude dye thoroughly washed with water, acetone and alcohol and then dried. After two recrystallizations from methyl alcohol the yield of purified dye was 0.60 g. (76%); M. P. 272–3° dec.

In a manner similar to that illustrated in Examples 44–47 above, the following dyes embraced by Formula Ia above were prepared:

| Dye | Yield, percent | M. P., °C. |
|---|---|---|
| 9-(1-ethyl-3,5-dimethyl-3-pyrryl)-1',3-dimethylthia-2'-carbocyanine iodide | 68 | 250–251 |
| 3,3'-dimethyl-9-(2-phenyl-1-pyrrocolyl)-4,5,4',5'-dibenzothiacarbocyanine p-toluenesulfonate | 25 | 294–295 |
| 3-ethyl-9-(1-ethyl-2,5-dimethyl-3-pyrryl)-3'-methyl-4,5,4',5'-dibenzothiacarbocyanine iodide | 20 | 224–225 |
| 3,3'-dimethyl-9-(2-methyl-3-indolyl)-4,5,4',5'-dibenzothiacarbocyanine p-toluenesulfonate | 42 | 287–288 |
| 9-(1,3-dimethyl-2-indolyl)-3,3'-diethyl-4,5,4',5'-dibenzothiacarbocyanine bromide | 32 | 242–243 |
| 3,3'-dimethyl-9-(2-methyl-3-indolyl)oxacarbocyanine perchlorate | 14 | 199–200 |
| 3,3'-dimethyl-9-(3-pyrryl)-4,5,4',5'-dibenzothiacarbocyanine p-toluenesulfonate | 47 | 272–273 |
| 3-ethyl-3'-methyl-9-(2-methyl-3-indolyl)-4',5',6,7-dibenzoxacarbocyanine perchlorate | 18 | 209–211 |
| 3,3'-dimethyl-9-(3-pyrryl)thiacarbocyanine iodide | 23 | 226–228 |
| 9-(3-indolyl)-3,3'-dimethylthiacarbocyanine p-toluenesulfonate | 49 | 317–318 |
| 3 3'-diethyl-9-(3-indolyl)-4,5,6',7'-dibenzothiacarbocyanine bromide | 51 | 225–226 |
| 3'3'-diethyl-9-(3-indolyl)-6,7-benzothiacarbocyanine bromide | 73 | 303–304 |
| 9,(3-indolyl)-3,3'-dimethyl-4,5,4',5'-dibenzothiacarbocyanine iodide | 13 | 283–284 |
| 9-(1-ethyl-2,5-dimethyl-3-pyrryl)-3,3'-dimethyl-4,5,4',5'-dibenzothiacarbocyanine iodide | 47 | 223–224 |
| 3,3'-dimethyl-9-(2-methyl-3-indolyl)oxathiacarbocyanine iodide | 39 | 250–251 |

The following examples will serve to illustrate more fully the manner whereby the new intermediates represented by Formula III above can be prepared.

*Example 48.—1,3'-diethyl-2,5,6-trimethyl-3-pyrrolothiacarbocyanine perchlorate*

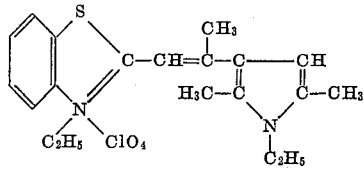

3-ethyl-2-methylbenzothiazolium p-toluenesulfonate (34.9 grams, 1 mol.), 1-ethyl-2,5-dimethylpyrrole (14.6 grams, 1 mol.+10 percent excess) and ethyl orthoacetate (24.3 grams, 1 mol.+200 percent excess) were refluxed in ethyl alcohol (25 ml.) for 4 hours. The reaction mixture was chilled and treated with aqueous sodium iodide (20 grams in 150 ml.). The solid which separated was filtered off and discarded. The filtrate was treated with an additional 400 ml. of water and chilled overnight. The product which separated was filtered off, washed with acetone and dried. After conversion to the perchlorate and two recrystallizations from methyl alcohol (and filtered through decolorizing carbon) the yield of pure dye was 4.5 percent; melting point 188°–190° C.

*Analysis.*—Calculated for $C_{20}H_{25}ClN_2O_4S$: C, 56.54; H, 5.93. Found: C, 56.9; H, 6.7.

*Example 49.—2,3',5,6 - tetramethyl - 1 - phenyl-4',5'-benzo-3-pyrrolothiacarbocyanine iodide*

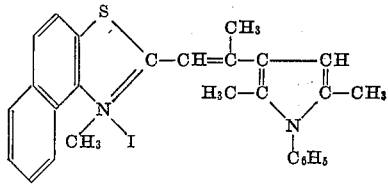

1,2-dimethylnaphtho 1,2-thiazolium p-toluenesulfonate (38.5 grams, 1 mol.), 2,5-dimethyl-1-phenylpyrrole (20 grams, 1 mol.+10% excess) and ethyl orthoacetate (25.0 grams, 1 mol.+200% excess) were refluxed in ethyl alcohol for three hours and then treated with sodium iodide (20 grams) in water (400 ml.) and chilled overnight. The aqueous solution was decanted and the residue washed with water and ether and finally stirred with acetone until crystalline. The crude dye was filtered off and then boiled with water (200 ml.) and filtered hot. The residue was washed with acetone and dried. After two recrystallizations from methyl alcohol (and filtered through decolorizing carbon) the yield of pure dye was 2%; M. P. 192°–3° C. dec.

*Example 50.—2,3',8 - trimethyl-4',5',6,7-dibenzo-3-indolothiacarbocyanine p-toluenesulfonate*

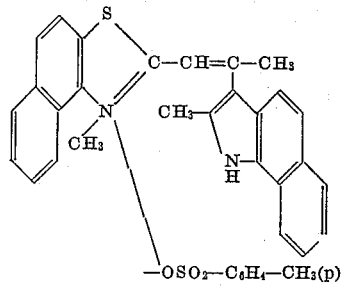

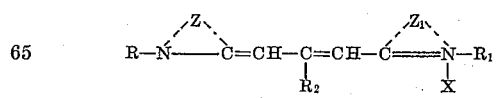

1,2 - dimethylnaphtho-[1,2]thiazolium p-toluenesulfonate (19.3 g., 1 mol.), 2-methyl-6,7-benzindole (9 g., 1 mol.) and ethyl orthoacetate (16 g., 1 mol.+100%) were refluxed in acetic anhydride (40 ml.) for one hour. The reaction mixture was then poured into warm water (400 ml.) and allowed to stand until the acetic anhydride had decomposed. Ether (400 ml.) was then added with stirring and the mixture chilled, filtered and the crude product washed with acetone and dried. The yield of dye after recrystallization from methyl alcohol was 1.25 g. (4%); M. P. 179–180° dec.

What we claim as our invention and desire secured by Letters Patent of the United States is:

1. A photographic silver halide emulsion sensitized with a supersensitizing combination of at least one carbocyanine dye selected from those represented by the following general formula:

$$R-N\underset{R_2}{\overset{Z}{\diagup}}C=CH-C=CH-C\underset{X}{\overset{Z_1}{\diagdown}}N-R_1$$

wherein R and $R_1$ each represents an alkyl group, $R_2$ represents a member selected from the group consisting of an alkyl group, an aryl group, and a pyrryl group, Z and $Z_1$ each represents the non-metallic atoms necessary to complete a heterocyclic nucleus containing from 5 to 6 atoms in the heterocyclic ring, and X represents an acid radical, and at least one carbocyanine dye selected from those represented by the following general formula:

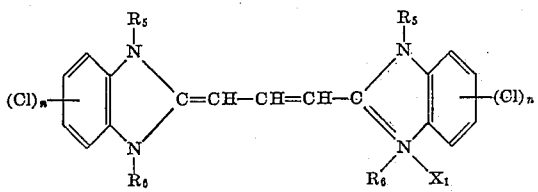

wherein $R_5$ and $R_6$ each represents an alkyl group, $n$ represents a positive integer of from 1 to 2, and $X_1$ represents an acid radical.

2. A photographic silver halide emulsion sensitized with a supersensitizing combination of at least one carbocyanine dye selected from those represented by the following general formula:

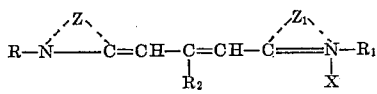

wherein R and $R_1$ each represents an alkyl group, $R_2$ represents a member selected from the group consisting of an alkyl group, an aryl group, and a pyrryl group, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the quinoline series, and X represents an acid radical, and at least one carbocyanine dye selected from those represented by the following general formula:

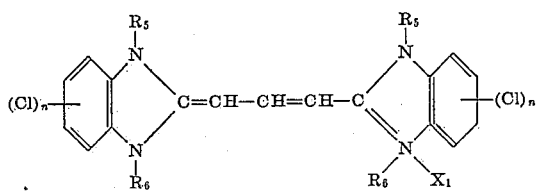

wherein $R_5$ and $R_6$ each represents an alkyl group, $n$ represents a positive integer of from 1 to 2, and $X_1$ represents an acid radical.

3. A photographic gelatino-silver-halide developing-out emulsion sensitized with a supersensitizing combination of at least one carbocyanine dye selected from those represented by the following general formula:

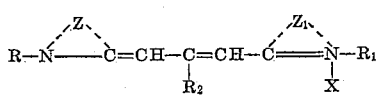

wherein R and $R_1$ each represents an alkyl group, $R_2$ represents a member selected from the group consisting of an alkyl group, an aryl group, and a pyrryl group, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the quinoline series, and X represents an acid radical, and at least one carbocyanine dye selected from those represented by the following general formula:

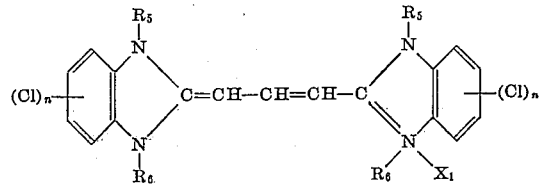

wherein $R_5$ and $R_6$ each represents an alkyl group, $n$ represents a positive integer of from 1 to 2, and $X_1$ represents an acid radical.

4. A photographic gelatino-silver-halide developing-out emulsion sensitized by a supersensitizing combination of at least one carbocyanine dye selected from those represented by the following general formula:

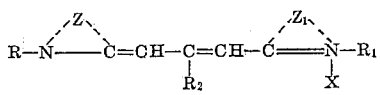

wherein R and $R_1$ each represents an alkyl group containing from 1 to 2 carbon atoms, $R_2$ represents a member selected from the group consisting of a methyl group, an ethyl group, and a phenyl group, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the quinoline series, and at least one carbocyanine dye selected from those represented by the following general formula:

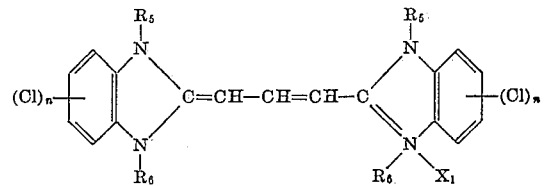

wherein $R_5$ and $R_6$ each represents a member selected from the group consisting of a methyl group, an ethyl group, and an allyl group, $n$ represents a positive integer of from 1 to 2, and $X_1$ represents an acid radical.

5. A photographic gelatino-silver-bromiodide developing-out emulsion sensitized by a supersensitizing combination of at least one carbocyanine dye selected from those represented by the following general formula:

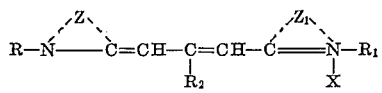

wherein R and $R_1$ each represents an alkyl group containing from 1 to 2 carbon atoms, $R_2$ represents a member selected from the group consisting of a methyl group, an ethyl group, and a phenyl group, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the quinoline series, and at least one carbocyanine dye selected from those represented by the following general formula:

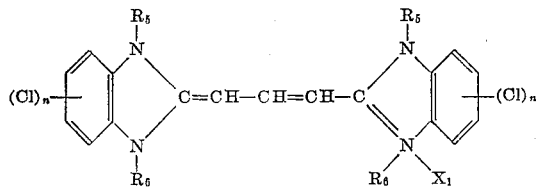

wherein $R_5$ and $R_6$ each represents a member selected from the group consisting of a methyl group, an ethyl group, and an allyl group, $n$ represents a positive integer of from 1 to 2, and $X_1$ represents an acid radical.

6. A photographic gelatino-silver-halide developing-out emulsion sensitized with a supersensitizing combination of at least one carbocyanine dye selected from those represented by the following general formula:

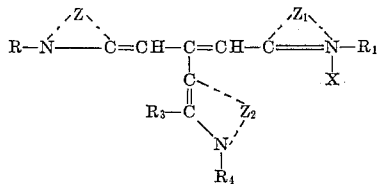

wherein R and $R_1$ each represents a member selected from the group consisting of a methyl group and an ethyl group, $R_3$ and $R_4$ each represents a member selected from the group consisting of a hydrogen atom, a methyl group, an ethyl group, and a phenyl group and $R_3$ and $R_4$ together represent the non-metallic atoms necessary to complete a heterocyclic nucleus of the pyridine series, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the quinoline series, $Z_2$ represents the non-metallic atoms necessary to complete a heterocyclic nucleus of the pyrrole series, and X represents an acid radical, and at least one carbocyanine dye selected from those represented by the following general formula:

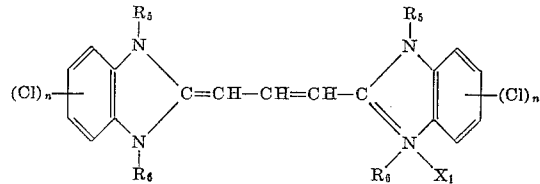

wherein $R_5$ and $R_6$ each represents a member selected from the group consisting of a methyl group, an ethyl group, and an allyl group, $n$ represents a positive integer of from 1 to 2, and $X_1$ represents an acid radical.

7. A photographic gelatino-silver-bromiodide developing-out emulsion sensitized with a supersensitizing combination of at least one carbocyanine dye selected from those represented by the following general formula:

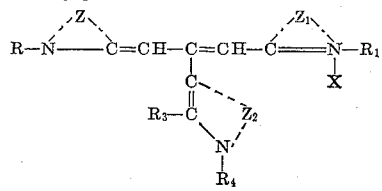

wherein R and $R_1$ each represents a member selected from the group consisting of a methyl group and an ethyl group, $R_3$ and $R_4$ each represents a member selected from the group consisting of a hydrogen atom, a methyl group, an ethyl group, and a phenyl group and $R_3$ and $R_4$ together represent the non-metallic atoms necessary to complete a heterocyclic nucleus of the pyridine series, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the quinoline series, $Z_2$ represents the non-metallic atoms necessary to complete a heterocyclic nucleus of the pyrrole series, and X represents an acid radical, and at least one carbocyanine dye selected from those represented by the following general formula:

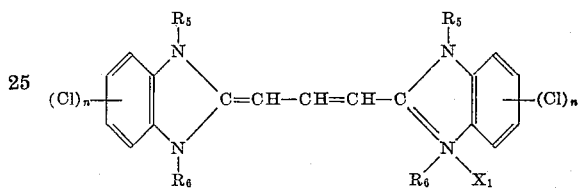

wherein $R_5$ and $R_6$ each represents a member selected from the group consisting of a methyl group, an ethyl group, and an allyl group, $n$ represents a positive integer of from 1 to 2, and $X_1$ represents an acid radical.

8. A photographic gelatino-silver-halide developing-out emulsion sensitized with a supersensitizing combination of at least one carbocyanine dye selected from those represented by the following general formula:

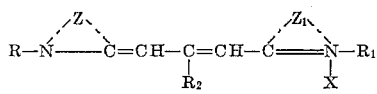

wherein R, $R_1$ and $R_2$ each represents an alkyl group containing from 1 to 2 carbon atoms, Z represents the non-metallic atoms necessary to complete a heterocyclic nucleus of the benzothiazole series, and X represents an acid radical, and at least one carbocyanine dye selected from those represented by the following general formula:

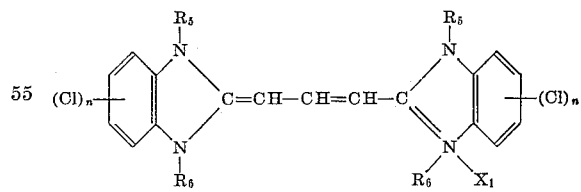

wherein $R_5$ and $R_6$ each represents a member selected from the group consisting of a methyl group, an ethyl group, and an allyl group, $n$ represents a positive integer of from 1 to 2, and $X_1$ represents an acid radical.

9. A photographic gelatino-silver-halide developing-out emulsion sensitized with a supersensitizing combination of at least one carbocyanine dye selected from those represented by the following general formula:

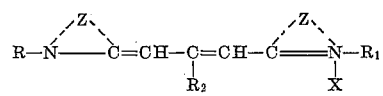

wherein R, $R_1$, and $R_2$ each represents an alkyl group containing from 1 to 2 carbon atoms, Z represents the non-metallic atoms necessary to complete a heterocyclic nucleus of the benzoselenazole series, and X represents an acid radical, and at least one carbocyanine dye selected from those represented by the following general formula:

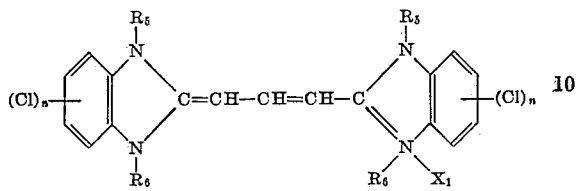

wherein $R_5$ and $R_6$ each represents a member selected from the group consisting of a methyl group, an ethyl group, and an allyl group, $n$ represents a positive integer of from 1 to 2, and $X_1$ represents an acid radical.

10. A photographic gelatino-silver-halide developing-out emulsion sensitized with a supersensitizing combination of at least one carbocyanine dye selected from those represented by the following general formula:

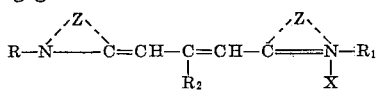

wherein R, $R_1$, and $R_2$ each represents an alkyl group containing from 1 to 2 carbon atoms, Z represents the non-metallic atoms necessary to complete a heterocyclic nucleus of the naphthothiazole series, and X represents an acid radical, and at least one carbocyanine dye selected from those represented by the following general formula:

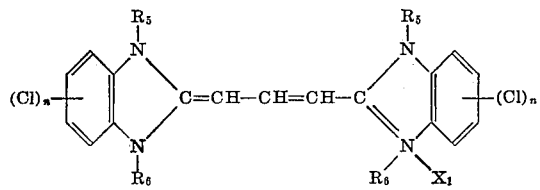

wherein $R_5$ and $R_6$ each represents a member selected from the group consisting of a methyl group, an ethyl group, and an allyl group, $n$ represents a positive integer of from 1 to 2, and $X_1$ represents an acid radical.

11. A photographic gelatino-silver-halide developing-out emulsion sensitized with a supersensitizing combination of at least one carbocyanine dye selected from those represented by the following general formula:

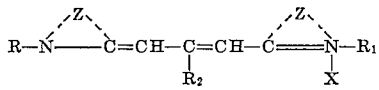

wherein R, $R_1$, and $R_2$ each represents an alkyl group containing from 1 to 2 carbon atoms, Z represents the non-metallic atoms necessary to complete a heterocyclic nucleus of the benzoxazole series, and X represents an acid radical, and at least one carbocyanine dye selected from those represented by the following general formula:

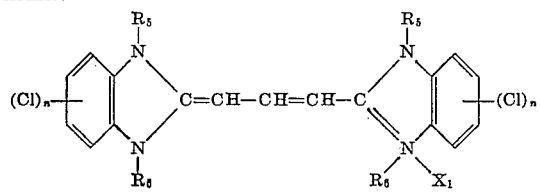

wherein $R_5$ and $R_6$ each represents a member selected from the group consisting of a methyl group, an ethyl group, and an allyl group, $n$ representss a positive integer of from 1 to 2, and $X_1$ represents an acid radical.

12. A photographic gelatino-silver-halide developing-out emulsion sensitized with a supersensitizing combination of at least one carbocyanine dye selected from those represented by the following general formula:

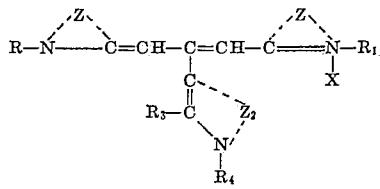

wherein R and $R_1$ each represents an alkyl group containing from 1 to 2 carbon atoms, $R_3$ and $R_4$ each represents a member selected from the group consisting of a hydrogen atom, a methyl group, an ethyl group, and a phenyl group, Z represents the non-metallic atoms necessary to complete a heterocyclic nucleus of the naphthothiazole series, $Z_2$ represents the non-metallic atoms necessary to complete a heterocyclic nucleus of the benzoindole series, and X represents an acid radical, and at least one carbocyanine dye selected from those represented by the following general formula:

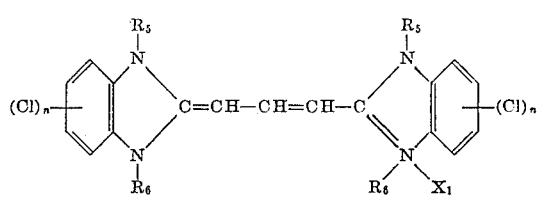

wherein $R_5$ and $R_6$ each represents a member selected from the group consisting of a methyl group, an ethyl group, and an allyl group, $n$ represents a positive integer of from 1 to 2, and $X_1$ represents an acid radical.

13. A photographic gelatino-silver-halide developing-out emulsion sensitized with a supersensitizing combination of 5,5'-dichloro-3,3',9-triethylthiacarbocyanine bromide and 5,5'-dichloro - 1,1',3,3' - tetraethylbenzimidazolocarbocyanine iodide.

14. A photographic gelatino-silver-halide developing-out emulsion sensitized with a supersensitizing combination of 3,3'-diethyl-9-methylselenacarbocyanine iodide and 5,5',6,6'-tetrachloro - 1,1',3,3' - tetraethylbenzimidazolocarbocyanine iodide.

15. A photographic gelatino-silver-halide developing-out emulsion sensitized with a supersensitizing combination of 3,3'-diethyl-8-methyl-4,5,4',5' - dibenzothiacarbocyanine bromide and 5,5',6,6' - tetrachloro - 1,1',3,3' - tetraethylbenzimidazolecarbocyanine iodide.

16. A photographic gelatino-silver-halide developing-out emulsion sensitized with a supersensitizing combination of 3,3'-diethyl-9-methyloxacarbocyanine iodide and 5,5'-dichloro-1,1',-3,3'-tetraethylbenzimidazolocarbocyanine iodide.

17. A photographic gelatino-silver-halide developing-out emulsion sensitized with a supersensitizing combination of 3,3'-dimethyl-9-(2-methyl-6,7-benzo-3-indolyl) - 4,5,4',5' - dibenzothiacarbocyanine p-toluenesulfonate and 5,5',-6,6' - tetrachloro - 1,1',3,3' - tetraethylbenzimidazolocarbocyanine iodide.

No references cited.